United States Patent [19]

Schlegel et al.

[11] Patent Number: 4,506,692
[45] Date of Patent: Mar. 26, 1985

[54] DEVICE FOR FEEDING A PRESSURE MEDIUM INTO A SHAFT

[75] Inventors: Andy Schlegel; Peter Busenhart, both of Winterthur, Switzerland

[73] Assignee: Rieter Machine Works, Ltd., Winterthur, Switzerland

[21] Appl. No.: 417,492

[22] Filed: Sep. 13, 1982

[30] Foreign Application Priority Data

Sep. 25, 1981 [CH] Switzerland .................. 6192/81

[51] Int. Cl.³ .......................... F16L 27/08
[52] U.S. Cl. ............................. 137/102; 137/580
[58] Field of Search .............. 137/102, 580; 92/106

[56] References Cited

U.S. PATENT DOCUMENTS 3,065,761 11/1962 Peras .................. 137/102

FOREIGN PATENT DOCUMENTS 2544851 6/1976 Fed. Rep. of Germany ...... 137/580

Primary Examiner—Martin P. Schwadron
Assistant Examiner—James R. Shay
Attorney, Agent, or Firm—Kenyon & Kenyon

[57] ABSTRACT

In order to avoid excessive wear between a sealing ring and a shaft, the sealing ring is provided with a biased sealing lip which is moved against the shaft by a pressure medium flowing into an infeed channel of the shaft. When not in use, the sealing lips are spaced from the shaft and serve to close off the pressure medium chambers of the feed device.

In order to exhaust air, the flow of pressure medium is shut off to the feed device so that the sealing lips are sprung back against a projection of the device in spaced relation to the shaft. This permits the pressure medium to exhaust from the shaft through a gap between the shaft and the feed device.

7 Claims, 6 Drawing Figures

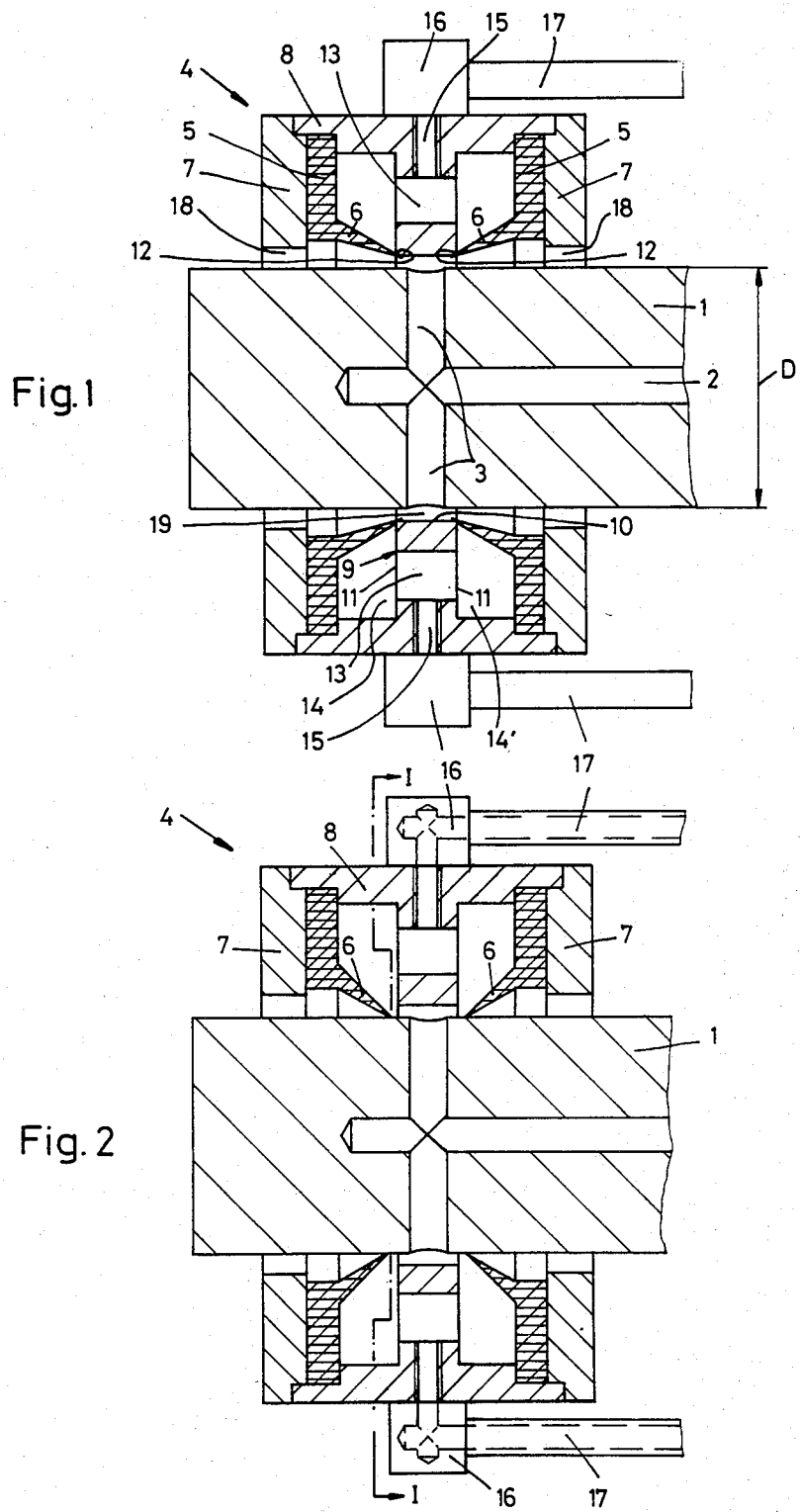

DEVICE FOR FEEDING A PRESSURE MEDIUM INTO A SHAFT

This invention relates to a device for feeding a pressure medium into a shaft.

As is known, if a shaft is to convey a pressure medium, or if a shaft is provided with any kind of element which is operable by a pressure medium, a device must be provided for feeding the pressure medium to the shaft. In many cases, the shaft is provided with an infeed channel while a stationary feed element for the pressure medium is disposed in sealed relation over the infeed channel. In this regard, the transition between the infeed channel of the shaft and the stationary feed element is sealed by various types of sealing devices.

Usually, the transition between the infeed channel of the shaft and the feed element is sealed off by stationary sealing rings which engage with one or more sealing faces on the shaft to avoid escape of the fed pressure medium. However, this arrangement has a disadvantage in that the sealing rings continually rest against the shaft, even during operation of the shaft. As a result, the sealing rings are subjected to wear which impairs the seal-tightness of the sealing rings.

Accordingly, it is an object of the invention to reduce the wear on a device for feeding a pressure medium into an infeed channel of a shaft.

It is another object of the invention to provide a device for feeding a pressure medium into a shaft having a infeed channel which has a relatively long life.

It is another object of the invention to maintain a seal tight relation between a pressure medium feeding device and a rotatable shaft having an infeed channel for receiving a pressure medium.

Briefly, the invention provides a device for feeding a pressure medium into an infeed channel of a shaft wherein the device includes an elastic seal which is movable under a flow of pressure medium from a rest position spaced from the shaft to a working position sealingly engaging the shaft in order to seal off the infeed channel from the atmosphere.

The device is such that the seal-tightness of the seal against the shaft is practically undiminished over time. Further, the seal of the device has a relatively long useful life.

In one embodiment, the device is provided with a pair of ring shaped seals which are disposed in coaxial relation for positioning astride a transverse infeed channel of a coaxial shaft. In addition, each seal has a ring-shaped sealing lip which is arranged in mirror image to the other for engaging with the shaft when a pressure medium is being fed into the shaft. In this embodiment, these seals are mounted in a housing which has a pair of chambers across which the sealing lips of the seals are disposed. In addition, a central wall is disposed coaxially between the chambers to receive the ends of the sealing lips in seal-tight relation when the seals are in the rest position.

In another embodiment, the device has a single annular seal which is mounted within a housing having a central projection and a chamber about the projection which is closed by the annular sealing lip when in the rest position.

These and other objects and advantages of the invention will become more apparent form the following detailed description taken in conjunction with the accompanying drawings wherein:

FIG. 1 illustrates a longitudinal cross-sectional view of a device according to the invention about a shaft;

FIG. 2 illustrates a view similar to FIG. 1 with the sealing elements in a working position;

Referring to FIG. 1, a rotatable shaft 1 is provided with a longitudinal channel 2 for the feeding of a pressure medium, for example a compressed gas such as air to a location of use (not shown), for example a pressure cylinder. In addition, the shaft 1 is provided with a transverse infeed channel 3 which connects the longitudinal channel 2 with the surrounding environment of the shaft 1.

Figure 3:
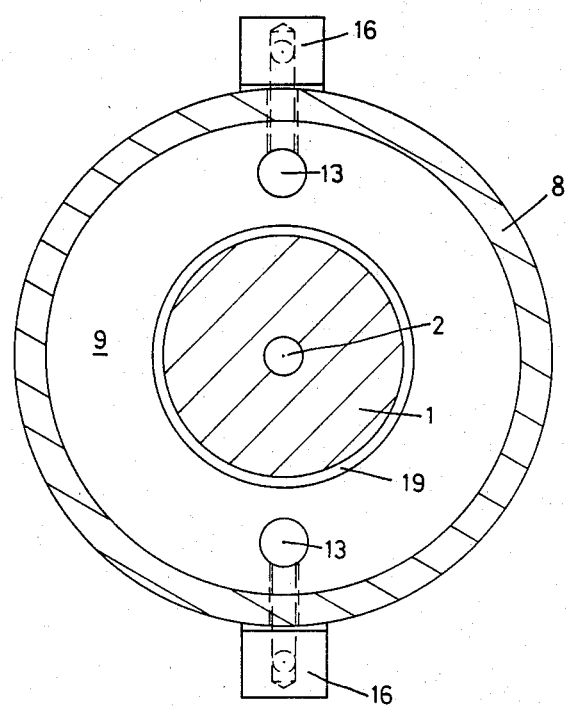
FIG. 3 illustrates a view taken on line I—I of FIG. 2.

As indicated, a stationary device 4 for feeding a pressure medium into the infeed channel 3 is positioned concentrically about the shaft 1. Any suitable means (not shown) may be used to secure the device 4 in place. The device 4 includes a housing which is formed by a pair of coaxial cover rings 7 and an annular intermediate ring 8. In addition, the intermediate ring 8 carries a ring-shaped projection 9 which forms a central wall so as to divide the housing into two chambers 14, 14'. As indicated in FIGS. 1 and 3, the central projection 9 is provided with a pair of transverse channels 13 which interconnect the ring shaped chambers 14, 14'.

The device 4 also includes a pair of coaxially disposed seals 5 which are mounted in the housing. As indicated, each seal 5 is of annular shape and is held in place between a cover ring 7 and the intermediate ring 8. Each seal 5 has a resilient sealing lip 6 of annular shape which projects across a respective chamber 14, 14' and rests against the central wall 9. Each of the sealing lips 6 is elastically deformable and the seals 5 and cover rings 7 are arranged in mirror-image fashion relative to one another.

The central wall or projection 9 extends radially inwardly and has a cylindrical surface 10 on the inside and two side surfaces 11 which face opposite to each other. Each sealing lip 6 is biased to lie in a rest position against the respective edge 12 formed by the cylindrical surface 10 and a side surface 11.

Referring to FIG. 1, the housing is also provided with a pair of passages in the form of screw-threaded bores 15, each of which is in communication with the annular chambers 14, 14' via the transverse channels 13. The screw threads of each bore 15 serves to receive a fitting, such as a connector nipple 16 for the infeed of a pressure medium via a lead 17.

As shown in FIG. 1, when in the rest position, each sealing lip 16 is sealed against an edge of the central projection 9 and is spaced from the rotatable shaft 1. However, each sealing lip is also sized so as to be directed radially inwardly into sealing engagement with the rotatable shaft 1 via the pressure of the pressure medium in the chambers 14, 14' as explained below.

In use, if the longitudinal channel 2 of the shaft 1 is to be supplied with a pressure medium during use, then the chambers 14, 14' of the feeding device 4 are filled with the pressure medium via the connector nipples 16. Because of the pressure increase in the chambers 14, 14', the sealing lips 6 are forced out of engagement with the central projection 9 into the working position sealingly engaging the cylindrical surface of the shaft 1. Because of this engagement, the feed of the pressure medium to the infeed channel 3 and the longitudinal channel 2 is sealed off from the atmosphere.

In order to exhaust air from the channel 2, the leads 17 are first exhausted, i.e. depressurized, for example by switching of a valve (not shown) connected thereto. The sealing lips 6 thus spring back to the rest position i.e. against the central projection 9. This opens the way for the pressure medium in the shaft 1 to escape through an annular gap 18 formed between the shaft 1 and the two cover rings 7.

As shown in FIG. 1, a ring-shaped gap 19 exists between the cylindrical surface 10 of the central projection 9 and the external cylindrical surface of the shaft 1 which has a diameter D. The size of this gap 19 is chosen in correspondence to the quantity of pressurized medium to be exhausted (cubic meters per minute), the movability of the lips 6 and the requirements for the tightness of the seal.

Figure 4:
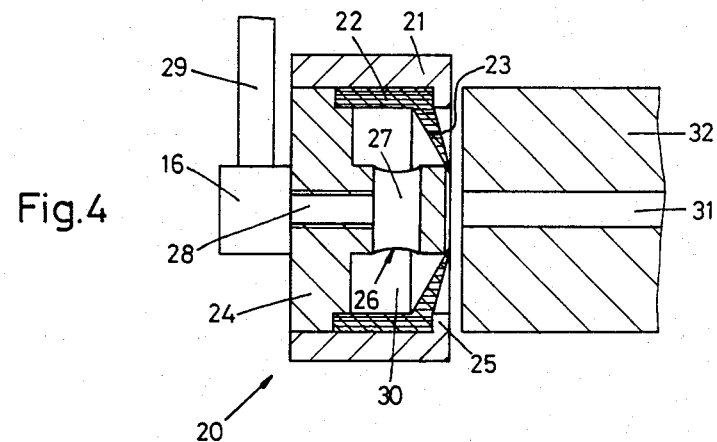
FIG. 4 illustrates a cross-sectional view of a modified device according to the invention in combination with a coaxially arranged shaft.

The following is an example of one embodiment which has been put in practice:
shaft 1: external diameter 37 millimeters
sealing ring 5: Sukkufit Pa 101, approximately 90 Shore hardness
diameter of the edge of the sealing lips 6 of the unrestrained seals 5: 40 millimeters
the diameter of the sealing lip 6 when installed: 38 millimeters (i.e., the lips 6 receive a bias during installation)
operating pressure: approximately 6 bar
required quantity of air at 6 bar: 0.2 cubic decimeters ($dm^3$)
exhaust to atmospheric pressure: in approximately 0.5 seconds Referring to FIG. 4, the feed device may be constructed for use with a rotatable shaft 32 having a coaxial infeed channel 31. To this end, the device 20 has a housing formed of an annular supporting ring 21 and a closure insert 24 which supports a central cylindrical projection 26. As indicated, the supporting ring 21 forms an annular chamber 30 about the projection 26. In addition, an annular seal 22 is mounted in the housing between the supporting ring 21 and the closure insert 24. As indicated, the seal 22 has an annular resilient sealing lip 23 which is disposed across the chamber 30 and which is biased against the circular peripheral edge 35 of a flat end face 34 of the projection 26.

The support ring 21 serves for the radial location of the seal 22 and together with the closure insert 24 for the axial location of the seal 22. In addition, the supporting ring 21 has a radially inwardly directed ring-shaped ledge 25 to effect a partial capture of the seal 22.

Figure 6:
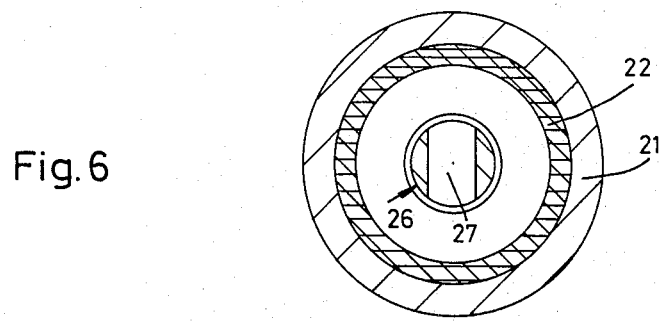
FIG. 6 illustrates a view taken on line II—II of FIG. 6.

The projection 26 is provided with a transverse channel 27 (see FIG. 6) which communicates diametrically opposed portions of the annular chamber 30. The projection 26 is also positioned so that the flat end face 34 faces the channel 31 of the shaft 32.

The addition, the closure insert 24 has a threaded passage 28 which opens into the channel 27 and which receives a fitting, such as connector nipple 16, as above, for the infeed of a pressure medium from a lead 29 connected to the nipple 16.

Figure 5:
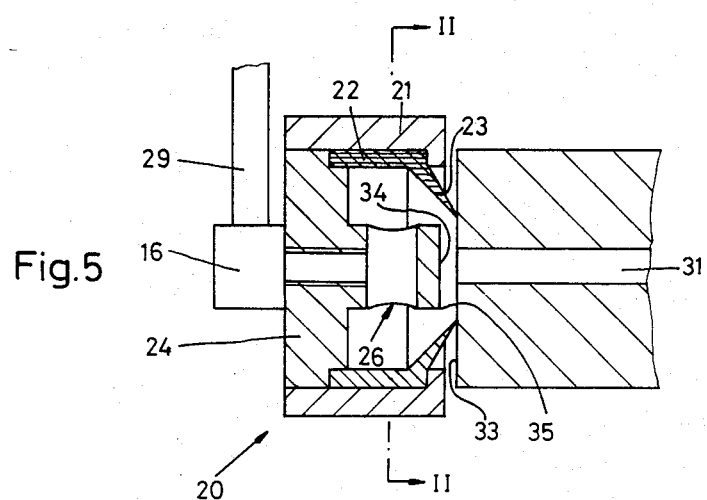
FIG. 5 illustrates a view similar to FIG. 4 with a seal of the device in a working position.

During use, if the longitudinal channel 31 of the shaft 32 is to be supplied with a pressure medium, then the chamber 30 of the feed device 20 is supplied with a pressure medium. The chamber 30 is then filled with the pressure medium and the annular sealing lip 23 is then moved from the rest position against the edge 35 into a working position engaging on an end face 33 of the shaft 32 (FIG. 5). In this way, the feed of the pressure medium to the channel 31 is sealed off from the surrounding environment, i.e. atmosphere.

In order to exhaust air from the shaft channel 31, an operation as described above with respect to the embodiment of FIGS. 1 to 3 can be performed. Likewise, the basic rule described above for choosing the size of the gap between the end face 34 of the projection 26 and the end face 33 of the shaft 32 applies.

Of note, both of the feed devices described above are equally suited for the transfer of a pressure medium to stationary shafts as well as rotating shafts. Further, the pressure medium may be a gas or a fluid. In using a fluid, known measures, for example for catching and storing or leaking or emerging fluid, are necessary. However, in the use of air as the pressure medium, there is the advantage that the emerging air can be taken up by the surrounding environment, i.e. the atmosphere.

Of note, the seals utilized in either of the embodiments may be made of a material such as Sukkufit Pa 101 which will tolerate a peripheral speed of 4 meters per second. Of course, any other suitable material may be used to form the seals and, particularly, the sealing lips.

What is claimed is:

1. A device for feeding a pressure medium into a rotatable shaft having at least one infeed channel, said device comprising
a housing having a pair of coaxially spaced chambers and a central wall coaxially between and separating said chambers; and
a pair of coaxially disposed seals mounted in said housing for positioning astride the infeed channel of the shaft, each seal having a resilient sealing lip disposed across a respective chamber and movable under the pressure of a pressure medium in said respective chamber from a rest position against said central wall and spaced from the shaft for sealing said respective chamber to a working position spaced from said wall and sealing engaging the shaft to expose said respective chamber to an exhaust of the pressure medium into the infeed channel of the shaft.

2. A device as set forth in claim 1 further comprising means for feeding a pressurized medium into said chambers.

3. In combination
a rotatable shaft having at least one infeed channel for receiving a pressurized medium; and
a device for feeding a pressurized medium into said infeed channel, said device including a housing spaced from said shaft and defining a chamber opposite said infeed channel, a passage in said housing in communication with said chamber to supply a pressurized medium thereto and at least one seal mounted in said housing and having a resilient lip disposed across said chamber, said lip being movable under the pressure of a pressure medium in said chamber from a rest position sealing said chamber and spaced from said shaft to a working position exposing said chamber and sealed against said shaft adjacent said infeed channel.

4. The combination as set forth in claim 3 wherein said infeed channel is disposed tranversely of said shaft and said housing is concentric to said shaft and wherein said device includes a pair of said seals concentric to said shaft with said infeed channel disposed therebetween.

5. The combination as set forth in claim 3 wherein said infeed channel and said housing are coaxially disposed and said lip is annular in shape.

6. A device for feeding a pressure medium into an infeed channel of a shaft, said device including
   a housing having a central wall to divide said housing into two chambers and at least one channel in said wall interconnected said chambers; and
   a pair of ring shaped seals disposed in coaxial relation for positioning astride a transverse infeed channel of a coaxial shaft, each seal having a ring-shaped sealing lip arranged in mirror image to the other seal and biased against said wall in a rest position thereof to close a respective chamber, each lip being movable from said wall under a flow of pressure medium into said chambers from said rest position to a working position sealingly engaging the shaft to seal off the transverse infeed channel from the atmosphere surrounding the shaft and the device.

7. In combination
   a rotatable shaft having at least one infeed channel for receiving a pressurized medium; and
   a device for feeding a pressure medium into said infeed channel, said device comprising
   a housing spaced from said shaft and defining a chamber for disposition opposite said infeed channel of said shaft;
   a passage in said housing in communication with said chamber to supply a pressurized medium thereto;
   a seal mounted in said housing and having a resilient lip disposed across said chamber and movable between a rest position sealing said chamber and a working position sealed against said shaft adjacent said infeed channel and exposing said chamber to an exhaust of pressure medium from said chamber into said infeed channel under the pressure of a pressure medium in said chamber; and
   a fitting in communication with said passage for feeding of a pressurized medium through said passage to said chamber.

* * * * *